Jan. 12, 1965 R. W. LARSON 3,165,215
HEEL BOOM LOG GRAPPLING APPARATUS
Filed Aug. 23, 1962
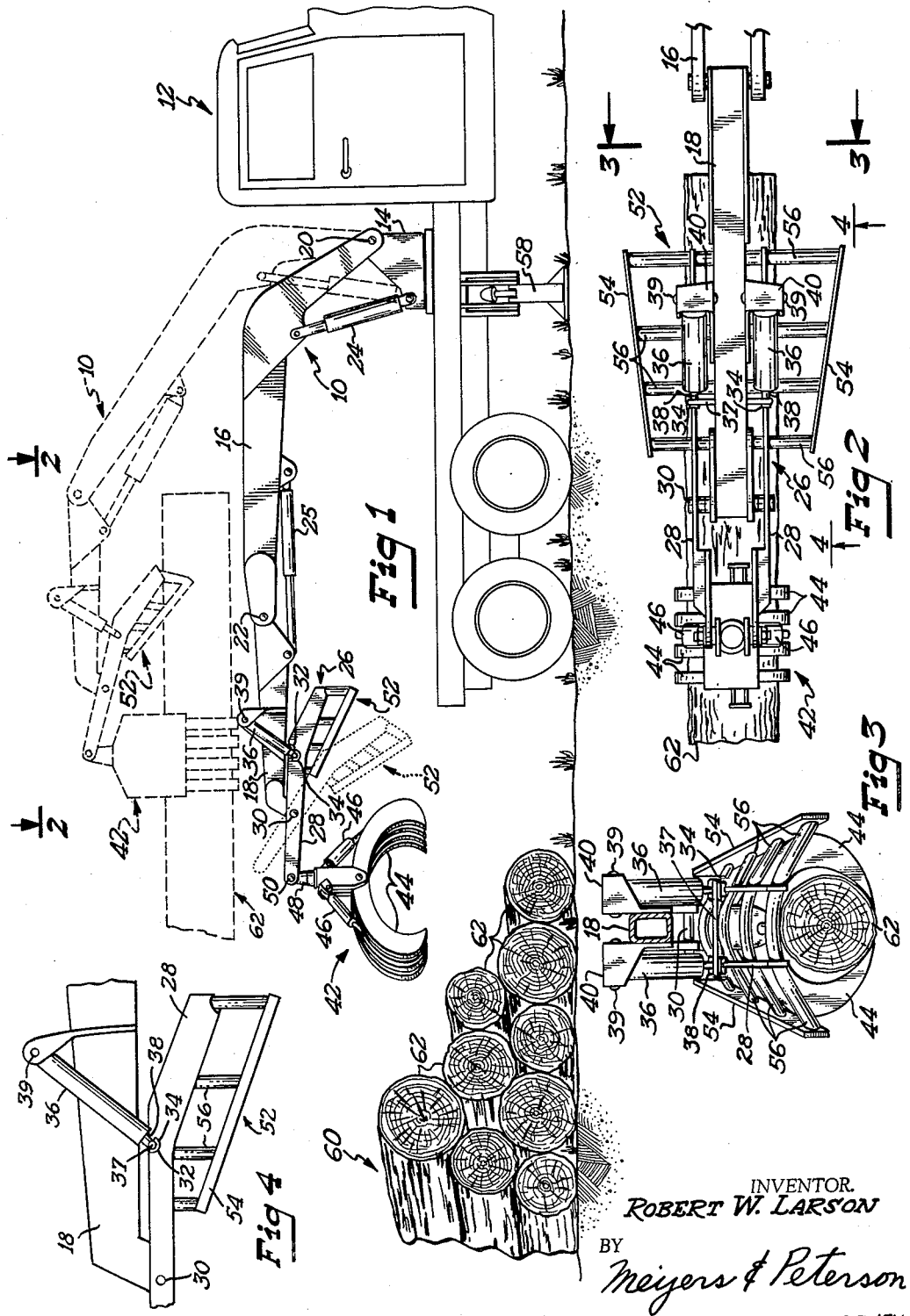
INVENTOR.
ROBERT W. LARSON
BY
Meijers & Peterson
ATTORNEY United States Patent Office
3,165,215
Patented Jan. 12, 1965

3,165,215
HEEL BOOM LOG GRAPPLING APPARATUS
Robert William Larson, Ashland, Wis., assignor to Beloit Corporation, a corporation of Wisconsin
Filed Aug. 23, 1962, Ser. No. 218,927
7 Claims. (Cl. 214—147)

This invention relates generally to log handling apparatus, and pertains more particularly to a heel boom grapple for leveling logs as they are fed to a slasher.

As is generally known in the logging art, a slasher cuts tree-length logs into shorter lengths, usually on the order of eight feet, called sticks. The tree-length logs must be presented to the slasher in a horizontal or level fashion, and it is the function of a heel boom loader to do this. Naturally, the output of a slasher crew depends on how fast logs can be handled.

Accordingly, the invention has for one object the provision of apparatus for rapidly leveling tree-length logs as they are picked up by the grapple mounted at the free end of a rotary boom assembly preparatory to delivering each log to the slasher, thereby appreciably increasing the total number of logs that can be processed by the slasher crew during a given period of time.

Another object of the invention is to obviate any need for orienting the logs by cables and the like as heretofore required in certain log handling equipment.

A further object is to provide logging apparatus of the foregoing character that is simple and sufficiently rugged to withstand the rigorous duty demanded by the logging industry.

These and other objects and advantages of this invention will more fully appear from the following description, made in connection with the accompanying drawing, wherein like reference characters refer to the same or similar parts throughout the several views and in which:

FIGURE 1 is a side view of my apparatus with the solidly depicted heel boom and grapple appearing in a position in which a log is about to be picked up from an adjacent pile of logs and the dotted position of the heel boom directly associated therewith indicating the degree of pivoting of the heel boom that is possible, whereas the dashed or more elevated view of the apparatus shows a log in the process of being handled;

FIGURE 2 is a plan view taken in the general direction of line 2—2 of FIGURE 1;

FIGURE 3 is a sectional view taken in the direction of line 3—3 of FIGURE 2; and, FIGURE 4 is a fragmentary side elevational view of the heel boom showing the association of the operating ram therewith.

Referring now in detail to the drawing, a rotary main boom assembly designated in its entirety by the reference numeral 10 has been pictured, this boom assembly being mounted on a truck 12 through the agency of a capstan 14. In the illustrated instance, the boom assembly 10 includes articulative boom members labeled 16 and 18. The boom member 16 is pivotally connected to the capstan 14 by a pivot pin 20, whereas the end boom member 18 is pivotally connected to the boom member 16 by means of a pivot pin 22. Thus, the boom assembly 10 is designed to be swung about a vertical axis, and the boom member 16 is adapted to be raised and lowered by a hydraulic ram 24, whereas the end boom member 18 is pivotally movable with respect to the boom member 16 by reason of a second hydraulic ram 25. These hydraulic rams, as are others to be referred to hereinafter, are of conventional construction, each including a cylinder and piston. Solely for the sake of simplifying the drawing as much as possible, the hydraulic lines for supplying fluid under pressure to the various hydraulic rams, both those that have been mentioned and those that will soon be referred to have been omitted. Likewise, the lines used for effecting rotation of the capstan 14 have been omitted.

An important aspect of the invention resides in the employment of a heel boom section 26 comprised of a pair of parallel side members or strips 28. The heel boom structure 26 is suspended at the free end of the boom member 18 of the assembly 10 by a transverse pivot pin 30. The pivot pin 30, it will be noted, is located intermediate the ends of the heel boom section 26. Aft of the pivot pin 30 are notches 32 formed in the parallel members or strips 28. These notches 32 each have a semicircular sleeve 34, welded or brazed therein which is used for a purpose presently to be described. A pair of hydraulic rams 36 have a transverse bar 37 connected between their projecting plunger or piston ends 38. The closed ends of the rams 36 are pivotally connected by pins 39 to the end boom 18 through the agency of brackets 40 integral with this boom. More specifically, one bracket 40 is secured to one side of this boom and the other bracket to the other side. When operated, the hydraulic rams 36 actuate the heel boom section 26 in a clockwise direction as viewed in FIGURE 1.

At this time, attention is directed to a grapple 42 having a plurality of cooperable jaws 44. Each set of jaws 44 is actuated by a hydraulic ram 46. In other words, the jaws 44 are urged together through the medium of the two rams 46. A hydraulically powered swivel mechanism or connector 48 (the hydraulic lines not being illustrated) permits the grapple 42 to be rotated about a vertical axis. The mechanism 48, it is to be observed, is connected to one end of the heel boom section 26, a transverse pin 50 providing pivotal movement of the grapple 42. Thus, while the swivel mechanism 48 allows the grapple to be rotated about a vertical axis, the pivotal connection at 50 permits the grapple to pivot about a horizontal axis so as to move in a vertical plane, that is, the general plane of the heel boom section 26. Inasmuch as the heel boom section 26 is pivotally suspended from the main boom assembly 10 by the transverse pin 30, it follows that the grapple 42 will also pivot in the same general plane in which the main boom assembly 10 resides. Attention is called at this time to a cradle unit 52 which is fixedly carried on the underside of the heel boom section 26. The cradle unit 52 faces downwardly and is constructed of a pair of side strips 54 rigidly interconnected by means of a plurality of transverse rods or tubes 56. The tubes 56 are bent or bowed upwardly at the middle or center, this condition being best seen from FIGURE 3. The weight of the grapple 42 normally urges the heel boom section 26 into the solid line position in which it appears in FIGURE 1 to assure continued engagement of the sleeves 34 on the side strips 28 with the transverse bar 37.

A pair of jacks 58 will normally be used in conducting the log handling operation. Any number of such jacks can be utilized, the number depending largely upon the type of truck 12.

For purposes of illustrating the invention as far as its operation is concerned, the log pile 60 has been shown in FIGURE 1. This pile 60 consists of a plurality of tree-length logs 62.

Bearing in mind the fact that the individual logs 62 are to be moved from the pile 60 to a slasher (not shown), the operation of my apparatus will be readily understood. In this regard, the grapple 42 is lowered into engagement with one of the logs 62 of the pile 60 by lowering the boom member 16 and usually the end boom 18 of the main boom assembly 10. It will be appreciated that the logs 62 are of considerable length and that the grapple 42 will pick up one of the logs nearer one end thereof than the other. Thus, as the boom assembly 10 is moved upwardly, one end of the log will either remain on the ground or on the pile, or it will assume a lower elevation than the end nearer the grapple 42. Hence, the log 62, when first picked up, has an angular attitude or relationship with the ground.

If the log pile 60 is not arranged coaxially with the truck 12, it will be appreciated that the main boom assembly 10 will be rotated about the vertical axis provided by the capstan 14 until the upper end of the log 60 is brought under the cradle unit 52. The swivel mounting of the grapple 42 permits this to occur. When the log 60 has been brought into alignment with the cradle unit 52, assuming that alignment is needed, the hydraulic rams 36 are operated so as to force the cradle unit 52 downwardly against the upper end of the log 62, thereby raising the end of the log that was previously on the ground. The degree of downward movement of the cradle unit 52 will be such as to force the log into a horizontal or level position. The transverse pin 50, of course, permits the grapple 42 to assume the proper position to permit the leveling of the log by the procedure just described. Hence, what occurs is that the heel boom section 26 is moved from its solid line position to the dotted line position just below.

With the log level, as shown in dashed outline toward the top of FIGURE 1, the log 62 can be swung around to the slasher which is normally at one side of the truck 12. The slasher thereby receives the log 62 in a horizontal or level position.

After delivering the log 62 to the slasher, the main boom assembly 10 is rotated back again for receiving or picking up a second log from the pile 60. The powered swivel 48 permits the grapple 42 to be rotated about its vertical axis so as to be best oriented for picking up the next log.

Consequently, it will be recognized, it is believed, that the heel boom log grappling apparatus that has just been described will function very satisfactorily for picking up logs of any length and orienting each log in a spatial relationship with the ground that will allow the log to be properly fed to a slasher. It will be appreciated that one operator can readily carry out the handling of logs with my exemplary apparatus.

It will, of course, be understood that various changes may be made in the form, details, arrangements and proportions of the parts without departing from the scope of my invention as set forth in the appended claims.

What is claimed is:

1. A heel boom log grappling apparatus comprising:
   (a) a main boom assembly,
   (b) a heel boom means pivotally suspended intermediate its ends from said main boom assembly,
   (c) a grapple pivotally carried at one end of said heel boom means for picking up logs,
   (d) downwardly facing cradle means at the other end of said heel boom means, and
   (e) actuating means on said main boom assembly for forcing said other end of the heel boom means downwardly to effect engagement of said cradle means with a log held by said grapple to thereby level said log.

2. A heel boom log grappling apparatus comprising:
   (a) a main boom assembly,
   (b) a heel boom member,
   (c) means mounting said heel boom member to the free end of said main boom assembly for pivotal movement in the general plane of said assembly,
   (d) a grapple for picking up logs,
   (e) means mounting said grapple to one end of said heel boom member for pivotal movement in the said general plane of said main boom assembly,
   (f) downwardly facing cradle means fixedly carried at the other end of said heel boom member, and
   (g) hydraulic means extending between said main boom assembly and said heel boom member for forcing said other end of the heel boom member downwardly to effect engagement of said cradle means to level a log held by said grapple.

3. A heel boom grappling apparatus in accordance with claim 2 in which said mounting means for the grapple includes a swivel connection for permitting said grapple to be rotated about a vertical axis.

4. A heel boom grappling apparatus in accordance with claim 3 in which said main boom assembly is mounted at its other end for rotation about a vertical axis.

5. A heel boom grappling apparatus in accordance with claim 4 in which said main boom assembly includes:
   (a) a plurality of articulatively connected link members, and
   (b) hydraulic means for actuating said link members to raise and lower said heel boom member.

6. A heel boom log grappling apparatus comprising:
   (a) first boom means,
   (b) second boom means suspended intermediate its ends from said first boom means for pivotal movement in a vertical plane,
   (c) a grapple for picking up logs,
   (d) means mounting said grapple to said second boom means nearer one end thereof for pivotal movement that is also in said vertical plane,
   (e) swivel means between said mounting means and said grapple for causing said grapple to rotate about an axis lying in said vertical plane,
   (f) downwardly facing cradle means carried on said second boom means nearer the other end thereof, and
   (g) power means extending between said first boom means and said second boom means for facing said other end of the second boom means away from said first boom means to level a log held by said grapple.

7. A heel boom grappling apparatus in accordance with claim 6 in which said grapple includes:
   (a) two sets of cooperable jaws, each set including a plurality of parallel jaws pivotal about a transverse axis disposed beneath said swivel means, and
   (b) power means for activating said two sets of jaws to effect engagement with a log to be picked up.

References Cited by the Examiner
UNITED STATES PATENTS

| 1,769,269 | 7/30 | Norris | 214—138 X |
| 2,656,059 | 10/53 | Troyer. | |
| 2,757,037 | 7/56 | Troyer. | |
| 2,814,396 | 11/57 | Neale | 214—3 |
| 2,903,146 | 9/59 | Meloy. | |
| 2,914,203 | 11/59 | Gafner | 214—138 X |

HUGO O. SCHULZ, *Primary Examiner.*